United States Patent
Park et al.

(10) Patent No.: US 11,870,905 B1
(45) Date of Patent: Jan. 9, 2024

(54) METHOD FOR PROVIDING USER IDENTITY BASED ON ZERO-KNOWLEDGE PROOF OVER BLOCKCHAIN NETWORK BY USING USER CERTIFICATE AND BLOCKCHAIN SYSTEM USING THE SAME

(71) Applicant: CPLABS, INC., Seongnam-si (KR)

(72) Inventors: Sanghyeon Park, Daegu (KR); Jeonghyuk Lee, Seongnam-si (KR); Seung Hwa Lee, Seoul (KR); Joonsun Uhr, Seongnam-si (KR)

(73) Assignee: CPLABS, INC., Seongnam-si (KR)

( * ) Notice: Subject to any disclaimer, the term of this patent is extended or adjusted under 35 U.S.C. 154(b) by 0 days.

(21) Appl. No.: 18/222,896

(22) Filed: Jul. 17, 2023

(30) Foreign Application Priority Data

Apr. 20, 2023 (KR) .......................... 10-2023-0052311

(51) Int. Cl.
*H04L 9/40* (2022.01)
*H04L 9/32* (2006.01)
*H04L 9/00* (2022.01)

(52) U.S. Cl.
CPC .......... *H04L 9/3218* (2013.01); *H04L 9/3268* (2013.01); *H04L 9/40* (2022.05); *H04L 9/50* (2022.05)

(58) Field of Classification Search
CPC . H04L 9/3218; H04L 9/40; H04L 9/50; H04L 9/3268
See application file for complete search history.

(56) References Cited

U.S. PATENT DOCUMENTS

| | | | |
|---|---|---|---|
| 2020/0067907 A1* | 2/2020 | Avetisov | H04L 63/12 |
| 2021/0160223 A1* | 5/2021 | Hwang | H04L 9/30 |
| 2021/0304193 A1* | 9/2021 | Cadet | G06Q 20/4014 |
| 2022/0020003 A1* | 1/2022 | Sarkar | H04L 9/3247 |
| 2022/0029825 A1* | 1/2022 | Uhr | H04L 9/3239 |
| 2022/0058646 A1* | 2/2022 | Oh | G06Q 20/065 |
| 2022/0222678 A1* | 7/2022 | Ferenczi | G06Q 20/3829 |
| 2023/0031621 A1* | 2/2023 | Pepe | H04L 9/50 |

(Continued)

OTHER PUBLICATIONS

Park et al., Beyond the Blockchain Address: Zero-Knowledge Address Abstraction, Feb. 14, 2023 at https://eprint.iacr.org/2023/191, 15 pages.

*Primary Examiner* — Ghodrat Jamshidi
(74) *Attorney, Agent, or Firm* — Rimon PC; Marc S. Kaufman

(57) ABSTRACT

A method for providing a user identity based on zero-knowledge proof over a blockchain network by using a user certificate is provided. The method includes steps of: an address abstraction smart contract (a) instructing the user terminal which made a user identity generating request to generate the user identity corresponding to the user certificate issued from a certification authority and generate a user identity proof by using user identity verifying parameters, the user identity, the user certificate and a certification authority public key, to thereby prove that the user identity is generated from the user certificate issued by the certification authority; and (b) upon receiving a user identity registering request from the user terminal, (i) verifying the user identity proof by using the user identity verifying parameters, the user identity, the certification authority public key and the user identity proof and (ii) registering the user identity upon successful verification.

22 Claims, 7 Drawing Sheets

(56) References Cited

U.S. PATENT DOCUMENTS

| | | | |
|---|---|---|---|
| 2023/0188353 A1* | 6/2023 | El Khiyaoui | H04L 9/3239 |
| | | | 713/168 |
| 2023/0259918 A1* | 8/2023 | Rao | G06Q 20/401 |
| | | | 705/67 |
| 2023/0259922 A1* | 8/2023 | Rao | G06Q 20/3823 |
| | | | 705/64 |

* cited by examiner

FIG. 7

| | DEFINITION | PURPOSE | ISSUING AUTHORITY |
|---|---|---|---|
| USER IDENTITY | | | |
| ADDRESS | A PUBLIC IDENTIFIER EMPLOYED FOR CONDUCTING ON-CHAIN TRANSACTIONS | TO FURNISH A MEANS OF IDENTIFYING AND MANAGING DIGITAL ASSETS IN A BLOCKCHAIN | GENERATED BY INDIVIDUAL USERS, NOT ISSUED BY A CENTRAL AUTHORITY |
| $H(cert)$ in zkAA | A SOLUTION UTILIZING CERTIFICATES *certs* AS A FORM OF IDENTIFICATION WITHIN A BLOCKCHAIN | TO TACKLE THE CHALLENGES ASSOCIATED WITH MAPPING EXISTING EXTERNAL IDENTITIES INTO BLOCKCHAIN-SPECIFIC IDENTITIES | *certs* CAN BE ISSUED AND VERIFIED BY TRUSTED web2 CERTIFICATION AUTHORITIES |

| | UNDERLYING CRYPTOGRAPHY | SECRET | CHAIN-SPECIFIC | COST |
|---|---|---|---|---|
| USER IDENTITY | | | | |
| ADDRESS | PUBLIC KEY CRYPTOGRAPHY (& HASH) | PRIVATE KEY | YES | TYPICALLY LOW, WITH ONLY MINIMAL FEES INCURRED FOR TRANSACTION PROCESSING |
| $H(cert)$ in zkAA | ZERO-KNOWLEDGE PROOF & HASH | CERTIFICATE, SUCH AS JSON WEB TOKEN | NO. USER IDENTITY REMAINS CONSISTENT ACROSS MULTIPLE CHAINS | THE COST OF IMPLEMENTATION VARIES DEPENDING ON THE SPECIFICS OF THE IMPLEMENTATION, BUT THE USE OF ZKPs GENERALLY INCREASES THE COST |

METHOD FOR PROVIDING USER IDENTITY BASED ON ZERO-KNOWLEDGE PROOF OVER BLOCKCHAIN NETWORK BY USING USER CERTIFICATE AND BLOCKCHAIN SYSTEM USING THE SAME

CROSS REFERENCE OF RELATED APPLICATION

This present application claims the benefit of the earlier filing date of Korean non-provisional patent application No. 10-2023-0052311, filed Apr. 20, 2023, the entire contents of which being incorporated herein by reference.

FIELD OF THE DISCLOSURE

The present disclosure relates to a method for providing a user identity based on zero-knowledge proof over a blockchain network by using a user certificate, and a blockchain system using the same; and more particularly, to the method for (i) generating a unique user identity usable on the blockchain network by using the user certificate issued outside the blockchain network and (ii) servicing the user identity based on the zero-knowledge proof over the blockchain network by using the user certificate to prove through the zero-knowledge proof that the user identity used on the blockchain network corresponds to an owner of the user identity, and server using the same.

BACKGROUND OF THE DISCLOSURE

The rapid growth of blockchain technology has brought about the proliferation of decentralized applications (dApps). However, despite their decentralized nature, these applications often require centralized authentication methods, such as social login or Know-Your-Customer (KYC) processes, to facilitate efficient operation and prevent malicious attacks, such as Sybil attacks, that cripple the operational reliability of the applications.

To meet this end, conventional approaches for integrating web2 identities, such as external certificates obtained from centralized certificate authorities, to web3 identities, such as addresses on blockchain networks, have often adopted the method of mapping external identities to blockchain-specific addresses.

However, these approaches have their limitations in that it is difficult to effectively utilize the external identities on the blockchain networks and that processes of validating user identities on the decentralized applications are complicated. These limitations can be particularly problematic for multi-chain dApps that need to manage a large number of blockchain-specific addresses, and can result in fragmentations of the user identities due to the limited cross-chain interoperability of the user identities, causing inconveniences to both service providers and users.

In addition, as the nature of the blockchain networks makes it easy to trace entire transaction histories of blockchain accounts, each account distinguished by each blockchain-specific address may also be subject to privacy leaks for the external identities mapped with the blockchain-specific addresses.

In response, as an attempt to improve the vulnerability of user accounts managed by the blockchain-specific addresses, existing platforms such as Ethereum have introduced the concept of Account Abstraction (AA) that allows users themselves to manipulate execution logics for permission controls, transaction restrictions, account recovery, transaction batch processing, etc. by integrating Externally Owned Accounts (EOA) with Contract Accounts (CA). Herein the EOAs are managed with private keys and are only capable of creating and signing transactions, while the CAs are managed through coding.

However, this Account Abstraction enables a single account to only handle a limited number of transactions, as verification of abstracted accounts performed during the process of registering transactions inevitably requires disclosure of the user certificates. There is also a disadvantage to this approach in that each contract account must be created for each blockchain network due to its lack of the cross-chain interoperability.

Therefore, an enhanced method for solving the aforementioned problems is required.

SUMMARY OF THE DISCLOSURE

It is an object of the present disclosure to solve all the aforementioned problems. It is another object of the present disclosure to enable generation of user blockchain identities of multiple forms from a single user identity such that the user blockchain identities can be used in various multi-chain decentralized applications (dApps) or web2-web3 hybrid dApps, without requiring a one-to-one mapping of external user identities outside blockchain networks to blockchain addresses.

It is still another object of the present disclosure to make it possible to verify on existing blockchain systems that the user blockchain identities used across one or more blockchain applications belong to the same user, without a need for performing hardforks on the existing blockchain systems.

It is still yet another object of the present disclosure to enable verification of the user identity without having to disclose personal information corresponding to the user identity, thereby securing the personal information against privacy leaks and enabling continued use of the user identity upon its creation.

In accordance with one aspect of the present disclosure, there is provided a method for providing a user identity based on zero-knowledge proof over a blockchain network by using a user certificate, including steps of: (a) in response to receiving from a user terminal a user identity generating request for generating a user identity to be used on a blockchain network, an address abstraction smart contract, operating at a virtual machine of the blockchain network, providing a user identity generating interface to the user terminal and thus instructing the user terminal (i) to generate the user identity corresponding to a user certificate issued from a certification authority and (ii) to generate a user identity proof by using user identity verifying parameters made public based on a zero-knowledge proof protocol, the user identity, the user certificate and a certification authority public key corresponding to the certification authority, wherein the user identity proof is used for proving that the user identity has been generated from the user certificate and that the user certificate has been issued by the certification authority; and (b) in response to receiving a user identity registering request, including the user identity verifying parameters, the user identity, the certification authority public key and the user identity proof, from the user terminal, the address abstraction smart contract (i) verifying the user identity proof by performing zero-knowledge-proof-based verification on the user identity verifying parameters, the user identity, the certification authority public key and the user identity proof and (ii) if the user identity proof is verified, registering the user identity as a valid identity of a user corresponding to the user terminal.

The method may further includes a step of: (c) in response to the user identity being registered as the valid identity of the user, the address abstraction smart contract performing at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user NFT by turning the user identity into a non-fungible token, (iii-2) assigning ownership of the user NFT to an Externally Owned Account, and (iii-3) registering the Externally Owned Account as the user blockchain identity.

There may be provided that, at the step of (b), the address abstraction smart contract initializes a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity.

There may be provided that the user identity verifying parameters are common reference strings generated at an address abstraction service provider by using relation values to be used for registering the user identity on a zero-knowledge proof basis, and wherein the address abstraction service provider that has deployed the address abstraction smart contract to the blockchain network stores the user identity verifying parameters on the blockchain network or on an external storage of the blockchain network such that the user identity verifying parameters are made retrievable by the address abstraction smart contract or the user identity generating interface.

There may be provided that, at the step of (a), the user terminal acquires the user certificate from the certification authority outside the blockchain network, and obtains the certification authority public key (i) directly from the certification authority or (ii) from an external storage of the blockchain network or the blockchain network when the certification authority public key is registered on the blockchain network.

In accordance with another aspect of the present disclosure, there is provided a method for providing a user identity based on zero-knowledge proof over a blockchain network by using a user certificate, including steps of: (a) in response to a user identity generated using a user certificate issued from a certification authority having been registered as a valid identity of a user and in response to receiving a transaction registering request from a user terminal, an address abstraction smart contract, operating at a virtual machine of a blockchain network, providing an abstracted transaction generating interface to the user terminal and thus instructing the user terminal (i) to generate the user identity corresponding to the user certificate and (ii) to generate an abstracted transaction proof by using abstracted transaction message verifying parameters made public based on a zero-knowledge proof protocol, the user identity, the user certificate, a transaction message hash value, corresponding to a hash value of a transaction message including information on a transaction intended to be performed by the user on the blockchain network, and a message sequence corresponding to the transaction message, and wherein the abstracted transaction proof is used for proving that the user who sent the transaction message is a true owner of the user identity and for proving validity of the transaction message and the message sequence; and (b) in response to receiving an abstracted transaction, including the abstracted transaction message verifying parameters, the user identity, the transaction message, the message sequence and the abstracted transaction proof, from the user terminal, the address abstraction smart contract (i) verifying the abstracted transaction proof by performing zero-knowledge-proof-based verification on the abstracted transaction message verifying parameters, the user identity, the transaction message hash value, corresponding to the hash value of the transaction message, the message sequence and the abstracted transaction proof, and (ii) if the abstracted transaction proof is verified, transferring the transaction message to the blockchain network so as to be executed and registering an execution result of the abstracted transaction as the transaction performed.

There may be provided that, at the step of (a), in response to the user identity having been registered as the valid identity of the user, the address abstraction smart contract has further performed at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user NFT by turning the user identity into a non-fungible token, (iii-2) assigning ownership of the user NFT to an Externally Owned Account, and (iii-3) registering the Externally Owned Account as the user blockchain identity.

There may be provided that, on condition that the address abstraction smart contract (i) has initialized a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity, and (ii) has registered the user identity itself or the wallet address matched with the user identity as the user blockchain identity by performing the first process or the second process, and in response to receiving the abstracted transaction from the user terminal, at the step of (b), the address abstraction smart contract (i) verifies whether the user blockchain identity corresponding to the user identity included in the abstracted transaction exists, (ii) when the user blockchain identity corresponding to the user identity is confirmed to exist, verifies whether a numerical value obtained by adding a value of 1 to a specific transaction sequence corresponding to the user identity corresponds to the message sequence included in the abstracted transaction, (iii) verifies the abstracted transaction proof by performing zero-knowledge-proof-based verification on the abstracted transaction message verifying parameters, the user identity, the transaction message hash value, corresponding to the hash value of the transaction message, the message sequence and the abstracted transaction proof, and (iv) when the abstracted transaction proof is verified, updates the specific transaction sequence to a numerical value corresponding to the message sequence, transfers the transaction message to the blockchain network so as to be executed and registers the execution result of the abstracted transaction as the transaction performed.

There may be provided that on condition that the address abstraction smart contract has registered the externally owned account corresponding to the user identity as the user blockchain identity by performing the third process, and in response to receiving the transaction registering request including the transaction message from the user terminal, at the step of (a), the address abstraction smart contract instructs the user terminal to generate the user identity corresponding to the user certificate, and in response to the user terminal transferring an executable transaction including the user identity and the transaction message to a specific blockchain node on which the executable transaction is to be executed and in response to the address abstraction smart contract receiving a verification request for the user identity from the specific blockchain node, at the step of (b), the address abstraction smart contract (i) verifies whether the user blockchain identity corresponding to the user identity included in the executable transaction exists and (ii) when the user blockchain identity corresponding to the user identity is confirmed to exist, transfers the transaction message to the blockchain network so as to be executed and registers an execution result of the executable transaction on the blockchain network.

There may be provided that the abstracted transaction message verifying parameters are common reference strings generated at an address abstraction service provider by using relation values to be used for registering the abstracted transaction on a zero-knowledge proof basis, and wherein the address abstraction service provider that has deployed the address abstraction smart contract to the blockchain network stores the abstracted transaction message verifying parameters on the blockchain network or on an external storage of the blockchain network such that the abstracted transaction message verifying parameters are made retrievable by the address abstraction smart contract or the abstracted transaction generating interface.

There may be provided that, at the step of (a), the transaction message includes information on function signatures corresponding to functions to be executed by the transaction, information on a target address on which the functions are to be executed, information on locations where data to be included as factors when calling the functions are located and information on cryptocurrency values required for execution of the functions.

In accordance with still another aspect of the present disclosure, there is provided a blockchain system for providing a user identity based on zero-knowledge proof over a blockchain network by using a user certificate, including: at least one blockchain node having: at least one memory that stores instructions; and at least one processor configured to execute the instructions to perform: (I) in response to receiving from a user terminal a user identity generating request for generating a user identity to be used on a blockchain network, a process of providing a user identity generating interface to the user terminal and thus instructing the user terminal, via an address abstraction smart contract operating at a virtual machine of the blockchain network, (i) to generate the user identity corresponding to a user certificate issued from a certification authority and (ii) to generate a user identity proof by using user identity verifying parameters made public based on a zero-knowledge proof protocol, the user identity, the user certificate and a certification authority public key corresponding to the certification authority, wherein the user identity proof is used for proving that the user identity has been generated from the user certificate and that the user certificate has been issued by the certification authority; and (II) in response to receiving a user identity registering request, including the user identity verifying parameters, the user identity, the certification authority public key and the user identity proof, from the user terminal, a process of (i) verifying the user identity proof, via the address abstraction smart contract, by performing zero-knowledge-proof-based verification on the user identity verifying parameters, the user identity, the certification authority public key and the user identity proof and (ii) if the user identity proof is verified, registering the user identity as a valid identity of a user corresponding to the user terminal, via the address abstraction smart contract.

The processor may further perform a process of: (III) in response to the user identity being registered as the valid identity of the user, the processor, via the address abstraction smart contract, performing at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user NFT by turning the user identity into a non-fungible token, (iii-2) assigning ownership of the user NFT to an Externally Owned Account, and (iii-3) registering the Externally Owned Account as the user blockchain identity.

There may be provided that, at the process of (II), the processor, via the address abstraction smart contract, initializes a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity.

There may be provided that the user identity verifying parameters are common reference strings generated at an address abstraction service provider by using relation values to be used for registering the user identity on a zero-knowledge proof basis, and wherein the address abstraction service provider that has deployed the address abstraction smart contract to the blockchain network stores the user identity verifying parameters on the blockchain network or on an external storage of the blockchain network such that the user identity verifying parameters are made retrievable by the address abstraction smart contract or the user identity generating interface.

There may be provided that, at the process of (I), the user terminal acquires the user certificate from the certification authority outside the blockchain network, and obtains the certification authority public key (i) directly from the certification authority or (ii) from an external storage of the blockchain network or the blockchain network when the certification authority public key is registered on the blockchain network.

In accordance with still yet another aspect of the present disclosure, there is provided a blockchain system for providing a user identity based on zero-knowledge proof over a blockchain network by using a user certificate, including: at least one blockchain node having: at least one memory that stores instructions; and at least one processor configured to execute the instructions to perform: (I) in response to a user identity generated using a user certificate issued from a certification authority having been registered as a valid identity of a user and in response to receiving a transaction registering request from a user terminal, a process of providing an abstracted transaction generating interface to the user terminal and thus instructing the user terminal, via an address abstraction smart contract, operating at a virtual machine of a blockchain network, (i) to generate the user identity corresponding to the user certificate and (ii) to generate an abstracted transaction proof by using abstracted transaction message verifying parameters made public based on a zero-knowledge proof protocol, the user identity, the user certificate, a transaction message hash value, corresponding to a hash value of a transaction message including information on a transaction intended to be performed by the user on the blockchain network, and a message sequence corresponding to the transaction message, and wherein the abstracted transaction proof is used for proving that the user who sent the transaction message is a true owner of the user identity and for proving validity of the transaction message and the message sequence; and (II) in response to receiving an abstracted transaction, including the abstracted transaction message verifying parameters, the user identity, the transaction message, the message sequence and the abstracted transaction proof, from the user terminal, (i) verifying the abstracted transaction proof, via the address abstraction smart contract, by performing zero-knowledge-proof-based verification on the abstracted transaction message verifying parameters, the user identity, the transaction message hash value, corresponding to the hash value of the transaction message, the message sequence and the abstracted transaction proof, and (ii) if the abstracted transaction proof is verified, transferring the transaction message to the blockchain network so as to be executed and registering an execution result of the abstracted transaction as the transaction performed, via the address abstraction smart contract.

There may be provided that, at the process of (I), in response to the user identity having been registered as the valid identity of the user, the processor has further performed, via the address abstraction smart contract, at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user NFT by turning the user identity into a non-fungible token, (iii-2) assigning ownership of the user NFT to an Externally Owned Account, and (iii-3) registering the Externally Owned Account as the user blockchain identity.

There may be provided that, on condition that the processor, via the address abstraction smart contract, (i) has initialized a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity, and (ii) has registered the user identity itself or the wallet address matched with the user identity as the user blockchain identity by performing the first process or the second process, and in response to receiving the abstracted transaction from the user terminal, at the process of (II), the processor, via the address abstraction smart contract, (i) verifies whether the user blockchain identity corresponding to the user identity included in the abstracted transaction exists, (ii) when the user blockchain identity corresponding to the user identity is confirmed to exist, verifies whether a numerical value obtained by adding a value of 1 to a specific transaction sequence corresponding to the user identity corresponds to the message sequence included in the abstracted transaction, (iii) verifies the abstracted transaction proof by performing zero-knowledge-proof-based verification on the abstracted transaction message verifying parameters, the user identity, the transaction message hash value, corresponding to the hash value of the transaction message, the message sequence and the abstracted transaction proof, and (iv) when the abstracted transaction proof is verified, updates the specific transaction sequence to a numerical value corresponding to the message sequence, transfers the transaction message to the blockchain network so as to be executed and registers the execution result of the abstracted transaction as the transaction performed.

There may be provided that, on condition that the processor, via the address abstraction smart contract, has registered the externally owned account corresponding to the user identity as the user blockchain identity by performing the third process, and in response to receiving the transaction registering request including the transaction message from the user terminal, at the process of (I), the processor, via the address abstraction smart contract, instructs the user terminal to generate the user identity corresponding to the user certificate, and in response to the user terminal transferring an executable transaction including the user identity and the transaction message to a specific blockchain node on which the executable transaction is to be executed and in response to the address abstraction smart contract receiving a verification request for the user identity from the specific blockchain node, at the process of (II), the processor, via the address abstraction smart contract, (i) verifies whether the user blockchain identity corresponding to the user identity included in the executable transaction exists and (ii) when the user blockchain identity corresponding to the user identity is confirmed to exist, transfers the transaction message to the blockchain network so as to be executed and registers an execution result of the executable transaction on the blockchain network.

There may be provided that the abstracted transaction message verifying parameters are common reference strings generated at an address abstraction service provider by using relation values to be used for registering the abstracted transaction on a zero-knowledge proof basis, and wherein the address abstraction service provider that has deployed the address abstraction smart contract to the blockchain network stores the abstracted transaction message verifying parameters on the blockchain network or on an external storage of the blockchain network such that the abstracted transaction message verifying parameters are made retrievable by the address abstraction smart contract or the abstracted transaction generating interface.

There may be provided that, at the process of (I), the transaction message includes information on function signatures corresponding to functions to be executed by the transaction, information on a target address on which the functions are to be executed, information on locations where data to be included as factors when calling the functions are located and information on cryptocurrency values required for execution of the functions.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 7 is a table schematically comparing a method of providing the user identity in a conventional blockchain system with the method of providing the user identity in accordance with one example embodiment of the present disclosure.

DETAILED DESCRIPTION OF THE PREFERRED EMBODIMENTS

Figure 1:
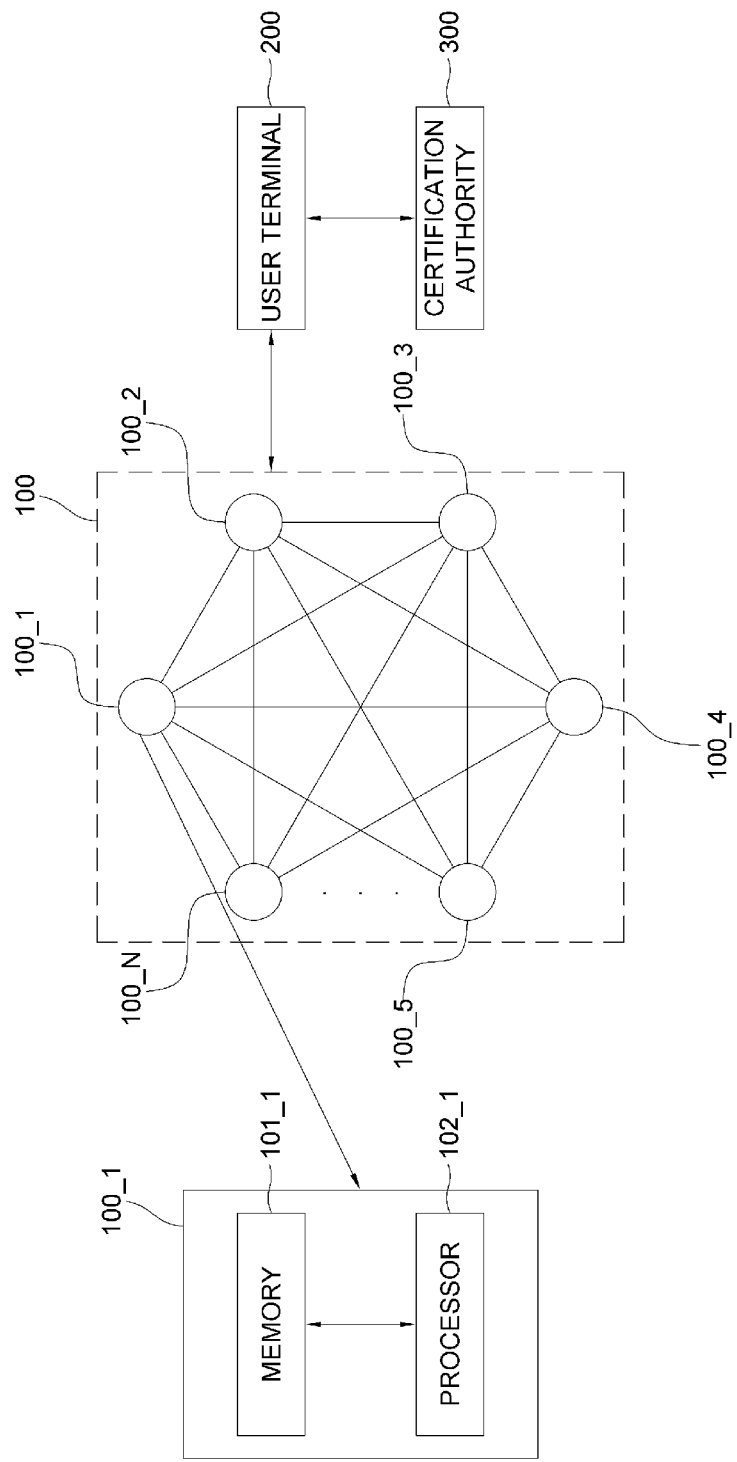
FIG. 1 is a drawing schematically illustrating a blockchain system that provides a user identity based on zero-knowledge proof over a blockchain network by using a user certificate in accordance with one example embodiment of the present disclosure.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a blockchain system that provides a user identity based on zero-knowledge proof over a blockchain network by using a user certificate in accordance with one example embodiment of the present disclosure. By referring to FIG. 1, the blockchain system in accordance with one example embodiment of the present disclosure may include a blockchain network 100 having a plurality of blockchain nodes capable of verifying the user identity and/or providing blockchain-based services. Further, the blockchain network 100 may interact with a plurality of user terminals 200, and these user terminals 200 may in turn interact with a Certification Authority 300 (also, referred to as a Certification Institution; inst.) in order to have the user certificate issued.

Firstly, the blockchain network 100 may generate blocks through a distributed consensus in the manner of P2P (peer-to-peer) by a plurality of blockchain nodes 100_1, 100_2, 100_3, 100_4, 100_5, . . . , 100_N, and record the generated blocks in a distributed ledger by connecting them with a chain.

Herein, the blockchain network 100 may be comprised of the multiple blockchain nodes, and each of the multiple blockchain nodes, a blockchain node 100_1, for example, may include a memory 101_1 for storing instructions to provide the user identity based on the zero-knowledge proof over the blockchain network by using the user certificate, and a processor 102_1 for providing the user identity based on the zero-knowledge proof over the blockchain network by using the user certificate according to the instructions in the memory 101_1. Herein, for convenience of explanation, FIG. 1 specifies the blockchain node that services the user identity based on the zero-knowledge proof over the blockchain network by using the user certificate to be the blockchain node 100_1.

Specifically, the blockchain node 100_1 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (operating system) and software configuration of applications that achieve specific purposes may be further included.

However, the case in which the computing device includes an integrated processor, integrating a medium, a processor and a memory, for implementing the present disclosure is not excluded.

Meanwhile, an address abstraction service provider for servicing the user identity based on the zero-knowledge proof may deploy an address abstraction smart contract to the blockchain network 100 in order to provide the user identity based on the zero-knowledge proof over the blockchain network 100 by using the user certificate, and the deployed address abstraction smart contract in turn may be operated in a virtual machine of the blockchain network 100.

Next, the user terminal 200, which needs to use an address abstraction service to generate the user identity utilized in blockchain services such as games, payment, voting, etc., may obtain the user certificate by requesting it from the Certification Authority 300, generate the user identity, based on the user certificate issued by the Certification Authority 300, through the address abstraction smart contract, and use the user identity generated therefrom in various blockchain networks without its use being limited by the system type of each of the blockchain networks. Herein, the user terminal 200 may be an entity that uses the blockchain network 100 and generates transactions for using the blockchain services, thus instructing the blockchain network 100 to register the transactions by verifying the user identity and transaction contents. Here onwards, the various types of the blockchain networks are all referred to as the blockchain network 100 or a singular form, 'blockchain network', for convenience of explanation.

A method of providing the user identity in accordance with one example embodiment of the present disclosure by using the blockchain system configured as explained above is described by referring to FIGS. 2 to 7.

Figure 2:
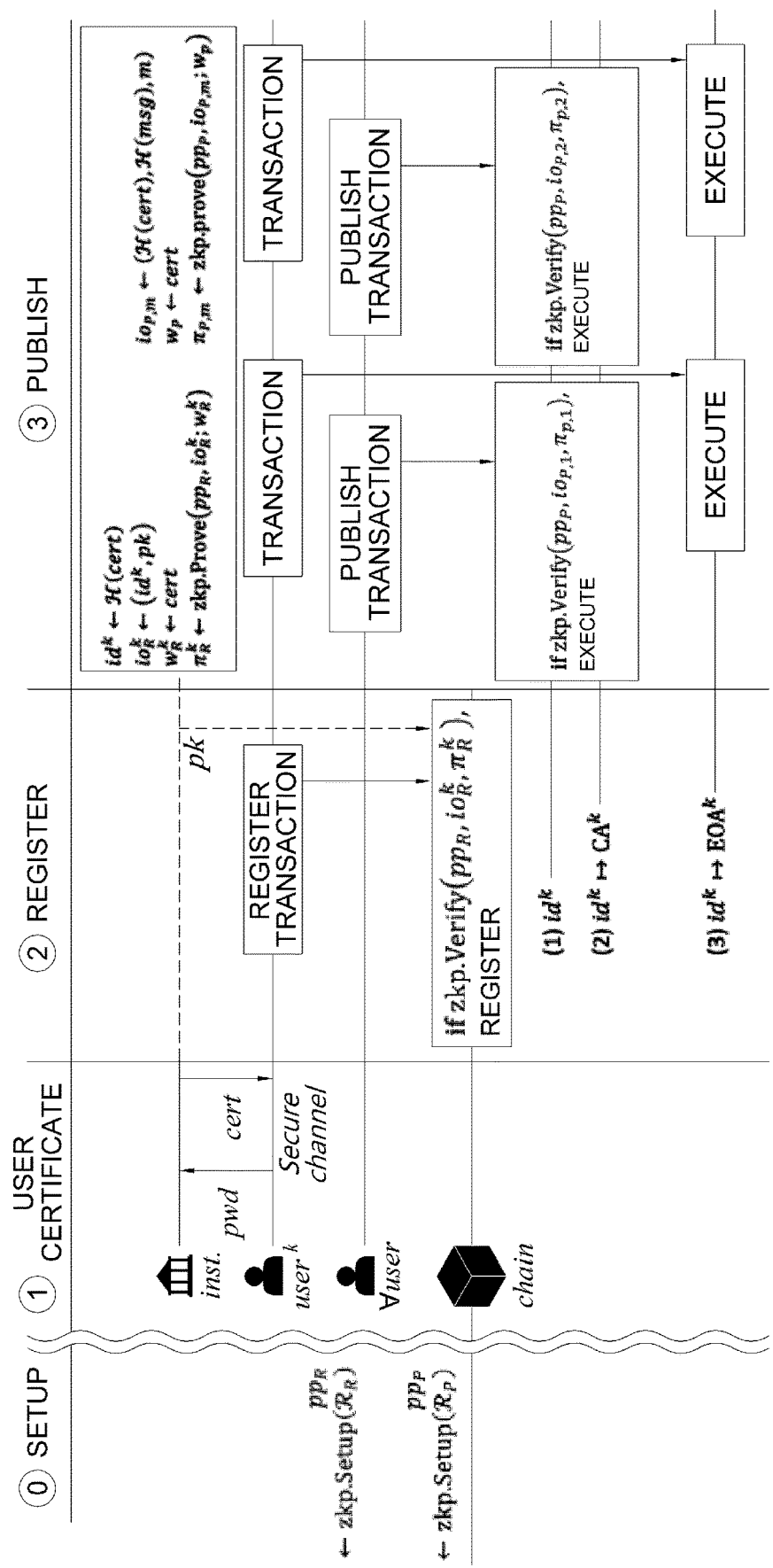
FIG. 2 is a drawing schematically illustrating a process of providing the user identity based on the zero-knowledge proof over the blockchain network by using the user certificate in accordance with one example embodiment of the present disclosure.

FIG. 2 is a drawing schematically illustrating a process of providing the user identity based on the zero-knowledge proof over the blockchain network by using the user certificate in accordance with one example embodiment of the present disclosure.

First, the address abstraction service provider that has deployed the address abstraction smart contract on the blockchain network 100 may have generated and stored user identity verifying parameters and abstracted transaction message verifying parameters needed for servicing the user identity, provided based on the zero-knowledge proof, via the deployed address abstraction smart contract.

Herein, the user identity verifying parameters may be common reference strings $crs_R$ generated at the address abstraction service provider by using relation values $R_R$ to be used for registering the user identity on a zero-knowledge proof basis ($crs_R \leftarrow zkp.Setup(R_R)$), and the address abstraction service provider may have stored the user identity verifying parameters on the blockchain network 100 or on an external storage of the blockchain network 100 such that the user identity verifying parameters are made retrievable by the address abstraction smart contract or a user identity generating interface. Herein, the external storage of the blockchain network 100 may be an InterPlanertary File System (IPFS) that has a form of Peer-to-Peer (P2P) distributed network capable of hosting and backing up data on multiple blockchain nodes, but the present disclosure is not limited thereto.

Also, the abstracted transaction message verifying parameters may be common reference strings $crs_P$ generated at the address abstraction service provider by using relation values $R_P$ to be used for registering an abstracted transaction on the zero-knowledge proof basis ($crs_P \leftarrow zkp.Setup(R_P)$), and the address abstraction service provider may have stored the abstracted transaction message verifying parameters on the blockchain network 100 or on the external storage of the blockchain network 100 such that the abstracted transaction message verifying parameters are made retrievable by the address abstraction smart contract or an abstracted transaction generating interface.

While the above describes the address abstraction service provider storing the user identity verifying parameters and the abstracted transaction message verifying parameters in the blockchain network or the external storage, it is also possible for the address abstraction smart contract to generate the user identity verifying parameters and the abstracted transaction message verifying parameters and store them in the blockchain network or the external storage. For example, the address abstraction service provider may transmit the each of the relation values $R_R$ and the relation values $R_P$ to the address abstraction smart contract and thus instruct the address abstract smart contract to generate the common reference strings $crs_R$ and the common reference strings $crs_P$ by using their respective zero-knowledge proof setup functions (($crs_R \leftarrow zkp.Setup(R_R)$ and $crs_P \leftarrow zkp.Setup(R_P)$) to store them in the blockchain network or the external storage.

Next, a user who wishes to use a user identity service provided in accordance with one example embodiment of the present disclosure may receive the user certificate (cert) from the certification authority 300 via the user terminal 200.

For example, the user may provide user's personal data pwd, such as a user's password, via the user terminal 200 to the certification authority 300 to obtain the user certificate, wherein examples of the user certificate may include web2 identities such as JSON Web Token (JWT).

Next, the user may broadcast a user identity generating request for generating the user identity, to be used on the blockchain network, via the user terminal 200 to the blockchain network. Herein, the user identity generating request may be transmitted to an address of the address abstraction smart contract (also referred to as zero-knowledge Address Abstraction contract; zkAA contract), and accordingly, at least one blockchain node included in the blockchain network may execute the address abstraction smart contract on the virtual machine and the address abstraction smart contract may in turn provide the user identity generating interface to the user terminal 200.

Then, through the user identity generating interface, the user terminal 200 may generate the user identity corresponding to the user certificate and register the user identity on the blockchain network to be able to prove that the user identity is based on the user certificate.

Herein, a method of generating and registering the user identity based on the zero-knowledge proof in the blockchain network by using the user certificate in accordance with one example embodiment of the present disclosure is coded and expressed as pseudocode shown below. Accordingly, the description followed after the pseudocode explains the method of generating and registering the user identity by referring to the pseudocode.

---

Algorithm 1
REGISTER

1:     pre-defined registration type $\tau \in \{\tau_1, \tau_2, \tau_3\}$
Require:
       $pp_R$, cert, institute's public key pk,
2:     procedure CALLREGISTER$^k(pp_R)$, cert, pk)
3:        $id^k \leftarrow \mathcal{H}(cert)$
4:        $\pi_R^k \leftarrow$ zkp.prove($pp_R$, (id, pk); cert)
5:        call REGISTER($pp_R$, id, pk, $\pi_R^k$)
Require: $pp_R$, id, pk, $\pi_R$
Ensure: 0/1, $id_{chain}$
6:     transaction REGISTER($pp_R$, id, pk, $\pi_R$)
7:        assert(id has not yet been registered)
8:        assert (zkp.Verify($pp_R$, (id, pk), $\pi_R$))
9:        register id within zkAA contract
10:     set $nonce_{id} \leftarrow 0$
11:     switch $\tau$ do
12:        case $\tau_1$                                          ▷ (id)
13:           return (1, id)
14:        case $\tau_2$                                ▷(id ↦ CA)
15:           create contract wallet controlled by id
16:           map id into address of conract wallet CA
17:           return (1, address(CA))
18:        case $\tau_3$                                ▷ (id ↦ EOA)
19:           create NFT contains id
20:           give ownership to msg . sender
21:           return (1, msg . sender)
22:     return (0, ⊥)

---

According to the pseudocode above, there may be three different types $\tau_1$, $\tau_2$, $\tau_3$ of a user blockchain identity corresponding to the user identity, and the user terminal 200 may perform a pre-determined registering process with one of the three different types selected. The three different types of the user blockchain identity are explained in more detail in the following description.

First, through the user identity generating interface, the user terminal 200 may generate the user identity by referring the user certificate issued by the certification authority 300.

Herein, the user terminal 200 may generate the user identity H(cert) by applying a hash function to the user certificate, but the present invention is not limited thereto and may include any type of functions where the user certificate cannot be reverse-generated or reverse-traced from the user identity.

Further, the user terminal 200 may generate a user identity proof $\pi_R^k$ by using the user identity verifying parameters $pp_R$ made public based on a zero-knowledge proof protocol, the user identity $id^k$, the user certificate cert and a certification authority public key pk corresponding to the certification authority, wherein the user identity proof is used for proving that the user identity has been generated from the user certificate of the user user$^k$ and that the user certificate has been issued by the certification authority, as expressed as $\pi_R^k \leftarrow$ zkp.Prove($pp_R$, ($id^k$, pk); cert) in the pseudocode. Herein, the certification authority public key may be used for authenticating the user certificate, and the user terminal 200 may obtain the certification authority public key directly from the certification authority or, if the certification authority public key is registered on the blockchain network 100, the user terminal 200 may obtain the certification authority public key from the blockchain network or the external storage of the blockchain network 100.

Thereafter, the user terminal 200 may broadcast a register transaction REGISTER($pp_R$, id, pk, $\pi_R^k$), including the user identity verifying parameters $pp_R$, the user identity $id^k$, the certification authority public key pk and the user identity proof $\pi_R^k$, to the blockchain network 100 with the address of the address abstraction smart contract as the destination.

Then, the address abstraction smart contract may verify the user identity proof by performing zero-knowledge-proof-based verification zkp.Verify($pp_R$, ($id^k$, pk), $\pi_R^k$) on the user identity verifying parameters, the user identity, the certification authority public key and the user identity proof. In other words, the zkp.Verify function may output 1 as a binary value if the user identity proof is successfully verified, and output 0 as a binary value if the verification of the user identity proof fails.

Accordingly, if the user identity proof is verified, the address abstraction smart contract may register the user identity as a valid identity for use on the blockchain network 100.

That is, in response to receiving a user identity registering request, i.e., the register transaction, the address abstraction smart contract may first confirm whether the user identity, requested to be registered, has already been registered, as expressed as assert (id has not yet been registered) in the pseudocode, and then verifies the user identity proof, as expressed as assert(zkp.Verify($pp_R$, ($id^k$, pk), $\pi_R^k$) in the pseudocode, to output whether the verification of the user identity proof is successful or not, such that if the verification is successful, the address abstraction smart contract may output the user blockchain identity along with the result of the verification and register the user identity within the address abstraction smart contract, as expressed as register id within zkAA contract in the pseudocode.

Also, herein, the address abstraction smart contract may initialize a transaction sequence $nonce_{id}$ of the user identity to 0, as expressed as set $nonce_{id} \leftarrow 0$ in the pseudocode. Herein, the transaction sequence generated by the address abstraction smart contract corresponds to a transaction accumulative counter, generated for each specific valid identity, to manage each specific transaction sequence performed by the each specific valid identity.

Further, in response to the user identity being registered as the valid identity of the user, the address abstraction smart contract may refer to one of the different types $\tau_1$, $\tau_2$, $\tau_3$ of user blockchain identity selected by the user terminal 200 and accordingly perform at least one of process among (i) a first process, according to the type $\tau_1$, of registering the user identity itself as the user blockchain identity, (ii) a second process, according to the type $\tau_2$, of (ii-1) generating a smart contract wallet, i.e., Contract Account: CA, managed by the user identity, (ii-2) matching the user identity with a wallet address of the smart contract wallet, and (ii-3) registering the wallet address as the user blockchain identity, and (iii) a third process, according to the type $\tau_3$, of (iii-1) generating a user NFT by turning the user identity into a non-fungible token, i.e., NFT, (iii-2) assigning ownership of the user NFT to an Externally Owned Account, i.e., EOA, and (iii-3) registering the Externally Owned Account as the user blockchain identity.

Accordingly, in response to receiving the user identity registering request REGISTER($pp_R$, $id^k$, pk, $\pi_R^k$) from the user terminal 200, the address abstraction smart contract may (i) output the verification result of the user identity proof, e.g., output 1 if successful or 0 if not successful, and (ii) output the generated user blockchain identity, e.g., id in case of the first process, address(CA) in case of the second process, msg.sender in case of the third process and a void value Ø in case the verification of the user identity proof is not successful.

Therefore, the present disclosure enables the user terminal 200 to register the user blockchain identity for use in the blockchain network 100 by using the user identity corresponding to the user certificate without having to disclose the user certificate. Further, depending on the type of identity required by each blockchain service, the user identity, the wallet address matched with the user identity or the externally owned account holding the user NFT can be interchangeably used as the user blockchain identity. Herein, an abstracted identity such as the user identity is able to prove its user by using the zero-knowledge proof, i.e., the user identity proof, and the address matched with the user identity is able to verify its user since it is connected to the user.

While the method of registering the user blockchain identity on the blockchain network by using the user certificate is described as above, a method of publishing the transactions for using the blockchain services on the blockchain network by using the user blockchain identity registered in accordance with one example embodiment of the present disclosure is described as follows.

By referring to FIG. 2 again, on condition that the user identity, generated by using the user certificate issued by the certification authority 300, has been registered as the valid identity, the address abstraction smart contract operating on the virtual machine of the blockchain network 100 may provide an abstracted transaction generating interface to the user terminal 200 in response to receiving a transaction registering request from the user terminal 200.

Herein, a method of publishing transactions by using the user identity, generated and registered based on the user certificate, in accordance with one example embodiment of the present disclosure is coded and expressed as pseudocode shown below. Accordingly, the description followed after the pseudocode explains the method of performing the transactions based on the user identity by referring to the pseudocode.

Algorithm 2
PUBLISH

```
 1:    pre-defined registration type τ ∈ {τ₁, τ₂, τ₃}
Require:
       pp_p, cert, nonce m,
       msg ← (target, funcsig, calldata, value)
 2:    procedure CALLPUBLISH(pp_p, cert, msg, m)
 3:        id ← H(cert)
 4:        π_{P,m} ← zkp.Prove(pp_p, (id, H(msg), m):cert)
 5:        if τ ∈ {τ₁, τ₂} then
 6:            call PUBLISH(pp_p, id, msg, m, π_{P,m})
 7:            if msg.value > 0 then
 8:                Send msg.value ETH to zkAA contract
 9:            else                                    ▷(id ↦ EOA)
10:                execute msg through normal transaction
Require: pp_p, id, msg, π_P
Ensure: 0/1, res_m
11:    transaction PUBLISH(pp_p, id, msg, m, π_P)
12:        assert(id must have been registered)
13:        assert(m == nonce_{id} +1)
14:        assert(zkp.Verify(pp_p, (id, H(msg), m), π_P)
15:        update nonce_{id} ← m
16:        switch τ do
17:            case τ₁                                   ▷(id)
18:                res ← execute msg with identifier id
```

Algorithm 2
PUBLISH

```
19:            return (1, res)
20:            case τ₂                                   ▷(id ↦ CA)
21:                res ← call ExecuteMsg(msg) of CA
22:                return (1, res)
           return (0, ⊥)
Require: msg
Ensure: execution result of msg
23:    function EXECUTEMSG(msg)
24:        assert(msg . sender == address(skAA contract))
25:        res ← execute msg
26:        return res
```

According to the pseudocode above, there may be three different types $\tau_1, \tau_2, \tau_3$ of the user blockchain identity corresponding to the user identity, and the user terminal 200 may perform a pre-determined transaction publishing process with one of the three different types selected. The transaction publishing process performed in accordance with each type of user blockchain identity is explained in more detail in the following description.

Herein, according to the method of registering the user identity described above, in response to the user identity having been registered as the valid identity for use on the blockchain network 100 and in response to the user terminal 200 having selected one of the three different types $\tau_1, \tau_2, \tau_3$ of the user blockchain identity, the address abstraction smart contract may have performed at least one of process among (i) the first process, according to the type $\tau_1$, of registering the user identity itself as the user blockchain identity, (ii) the second process, according to the type $\tau_2$, of (ii-1) generating the smart contract wallet (Contract Account; CA) managed by the user identity, (ii-2) matching the user identity with the wallet address of the smart contract wallet, and (ii-3) registering the wallet address as the user blockchain identity, and (iii) the third process, according to the type $\tau_3$, of (iii-1) generating the user NFT by turning the user identity into the non-fungible token, i.e., NFT, (iii-2) assigning ownership of the user NFT to the Externally Owned Account, i.e., EOA, and (iii-3) registering the Externally Owned Account as the user blockchain identity. Also, the address abstraction smart contract may have initialized the transaction sequence nonce$_{id}$ of the user identity to 0, as expressed as set nonce$_{id}$←0 in the pseudocode. Herein, the transaction sequence generated by the address abstraction smart contract corresponds to the transaction accumulative counter, generated for each specific valid identity, to manage each specific transaction sequence performed by the each specific valid identity.

By referring to the pseudocode for publishing above, the user terminal 200 may generate a transaction message msg containing information on a transaction intended to be performed by the user. Herein, the transaction message may include information on function signatures funcsig corresponding to functions to be executed by the transaction, information on a target address target on which the functions are to be executed, information on locations calldata where data to be included as factors when calling the functions are located and information on cryptocurrency values value required for execution of the functions.

Following, the user terminal 200 may generate the user identity corresponding to the user certificate by using the abstracted transaction generating interface, provided by the address abstraction smart contract in response to receiving the transaction registering request. Herein, the user terminal 200 may generate the user identity H(cert) by applying the hash function to the user certificate, but the present invention is not limited thereto and may include any type of functions where the user certificate cannot be reverse-generated or reverse-traced from the user identity.

Next, the user terminal 200 may generate a transaction message hash value H(msg) of the transaction message msg generated earlier. Herein, the user terminal 200 may generate the transaction message hash value H(msg) by applying a hash function to the transaction message msg, but the present invention is not limited thereto and may include any type of functions where the transaction message cannot be reverse-generated or reverse-traced from the transaction message hash value.

Afterwards, the user terminal 200 may generate an abstracted transaction proof $\pi_{P,m}$ by using the abstracted transaction message verifying parameters $pp_P$ made public based on a zero-knowledge proof protocol, the user identity $id^k$, the user certificate cert, the transaction message hash value H(msg), corresponding to a hash value of the transaction message msg including information on the transaction intended to be performed by the user on the blockchain network 100, and a message sequence m corresponding to the transaction message, as expressed as $\pi_{P,m} \leftarrow$ zkp.Prove $(pp_P, (id^k, H(msg), m); cert)$ in the pseudocode. Herein, the abstracted transaction proof is used for proving that the user who sent the transaction message is a true owner of the user identity and for proving validity of the transaction message and the message sequence.

Accordingly, on condition that the address abstraction smart contract has registered the user identity itself or the wallet address matched with the user identity as the user blockchain identity by performing the first process or the second process, the user terminal 200 may broadcast the abstracted transaction to the blockchain network 100 with the address of the address abstraction smart contract as the destination. Herein, the abstracted transaction, i.e., a publish transaction PUBLISH($pp_P$, id, msg, m, $\pi_{P,m}$) may include the abstracted transaction message verifying parameters $pp_P$, the user identity $id^k$, the transaction message msg, the message sequence m and the abstracted transaction proof $\pi_{P,m}$. By referring to FIG. 2, herein, the user indicated as ∀user is the same user as $user^k$ who registered the user identity earlier, but the separate indication (∀user) has been used for convenience to refer to the user who has registered his or her user blockchain identity using the first process or the second process explained earlier and generates the abstracted transaction therefrom. Also, depending on the abstracted transaction generated, cryptocurrency payment may be required to execute the address abstraction smart contract, and in such case, the user terminal 200 may transmit the cryptocurrency values value required for the execution of the functions included in the transaction message of the abstracted transaction, i.e., cryptocurrency values, such as ETH, corresponding to the cost required to execute the address abstraction smart contract, to the address abstraction smart contract along with the abstracted transaction.

On the other hand, in response to the address abstraction smart contract having registered the externally owned account corresponding to the user identity as the user blockchain identity by performing the third process and in response to receiving the transaction registering request including the transaction message msg from the user terminal 200, the address abstraction smart contract may instruct the user terminal 200 to generate the user identity corresponding to the user certificate, without instructing to generate the abstracted transaction proof and the abstracted transaction including the abstracted transaction proof generated therefrom. The user terminal 200 may then broadcast an executable transaction including the user identity and the transaction message to the blockchain network 100 with the address of a specific blockchain node on which the executable transaction is to be executed as the destination.

Again, looking at the case where the address abstraction smart contract has registered the user identity itself or the wallet address matched with the user identity as the user blockchain identity by performing the first process or the second process, the address abstraction smart contract may verify the abstracted transaction proof by performing zero-knowledge-proof-based verification zkp.Verify($pp_P$, ($id^k$, H(msg), m), $\pi_{P,m}$) on the abstracted transaction message verifying parameters, the user identity, the transaction message hash value, corresponding to the hash value of the transaction message, the message sequence and the abstracted transaction proof. That is, the zkp.Verify function may output 1 as a binary value if the abstracted transaction proof is successfully verified, and output 0 as a binary value if the verification of the abstracted transaction proof fails.

Accordingly, if the abstracted transaction proof is verified, the address abstraction smart contract may transfer the transaction message to the blockchain network so as to be executed and register an execution result of the abstracted transaction as the transaction performed. In other words, in response to receiving an abstracted transaction registering request, e.g., receiving the abstracted transaction registering request in the form of the abstracted transaction PUBLISH ($pp_P$, $id^k$, msg, m, $\pi_{P,m}$), from the user terminal 200, the address abstraction smart contract may (i) output the verification result of the abstracted transaction proof, e.g., output 1 if successful or 0 if not successful), and (ii) output the execution result of the abstracted transaction res in case the verification of the abstracted transaction proof is successful or a void value ∅ in case the verification is not successful.

In detail, in response to receiving the abstracted transaction from the user terminal 200, the address abstraction smart contract may (i) verify whether the user blockchain identity corresponding to the user identity included in the abstracted transaction exists, as expressed as assert(id must have been registered) in the pseudocode, (ii) when the user blockchain identity corresponding to the user identity is confirmed to exist, verify whether a numerical value obtained by adding a value of 1 to a specific transaction sequence corresponding to the user identity corresponds to the message sequence included in the abstracted transaction, as expressed as assert(m==$nonce_{id}$+1) in the pseudocode, (iii) verify the abstracted transaction proof by performing zero-knowledge proofbased verification on the abstracted transaction message verifying parameters, the user identity, the transaction message hash value, corresponding to the hash value of the transaction message, the message sequence and the abstracted transaction proof, as expressed as assert zkp.Verify($pp_P$, ($id^k$, H(msg), m), $\pi_{P,m}$) in the pseudocode, and (iv) when the abstracted transaction proof is verified, update the specific transaction sequence to a numerical value corresponding to the message sequence, as expressed as $nonce_{id} \leftarrow$ m in the pseudocode, transfer the transaction message to the blockchain network so as to be executed and register the execution result of the abstracted transaction as the transaction performed.

On the other hand, in response to the address abstraction smart contract having registered the externally owned account corresponding to the user identity as the user blockchain identity by performing the third process and in response to the address abstraction smart contract receiving a verification request for the user identity from the specific blockchain node as a result of the user terminal 200 transferring the executable transaction including the user identity and the transaction message to the specific blockchain node on which the executable transaction is to be executed, the address abstraction smart contract may (i) verify whether the user blockchain identity corresponding to the user identity included in the executable transaction exists, as expressed as assert(msg.sender==address(zkAA contract))) in the pseudocode, and (ii) when the user blockchain identity corresponding to the user identity is confirmed to exist, transfer the transaction message to the blockchain network so as to be executed and register an execution result of the executable transaction on the blockchain network.

As described above, the address abstraction smart contract executed by the present disclosure generates a unique identity corresponding to the user and keeps the information on the user certificate used for generating the user's unique identity only known to the user and the certification authority, while allowing the validity of the user identity corresponding to the user certificate to be publicly verified by using the user identity proof and the abstracted transaction proof, without revealing the user certificate. This, in other words, means that the user with a valid user certificate is always able to generate a valid user identity proof and a valid abstracted transaction proof for executable transaction messages and corresponding message sequences.

Also, in the present disclosure, the transaction messages are included in the abstracted transaction proof so as to prevent tampering of abstracted transaction generated therefrom and ensure that the address abstraction smart contract only performs specified operations. Additionally, the present disclosure utilizes the message sequence to thereby ensure that one or more of the abstracted transaction is executed in sequence without alteration or omission.

Furthermore, in contrast to conventional methods that perform the address abstraction only with hash values or Merkle Trees, the present disclosure keeps the information on the user certificate private such that the user identity can be used for an unlimited number of times, once generated. Also, since the user can insert the transaction message corresponding to the user request into the abstracted transaction, the present disclosure is suitable for performing transactions of various types.

Accordingly, FIGS. 3 to 6 schematically demonstrate various application examples of providing the user identity based on the zero-knowledge proof over the blockchain network by using the user certificate in accordance the present disclosure. In the following description, detailed explanation of parts that can be easily understood from the description provided by referring to FIGS. 1 and 2 is omitted.

Figure 3:
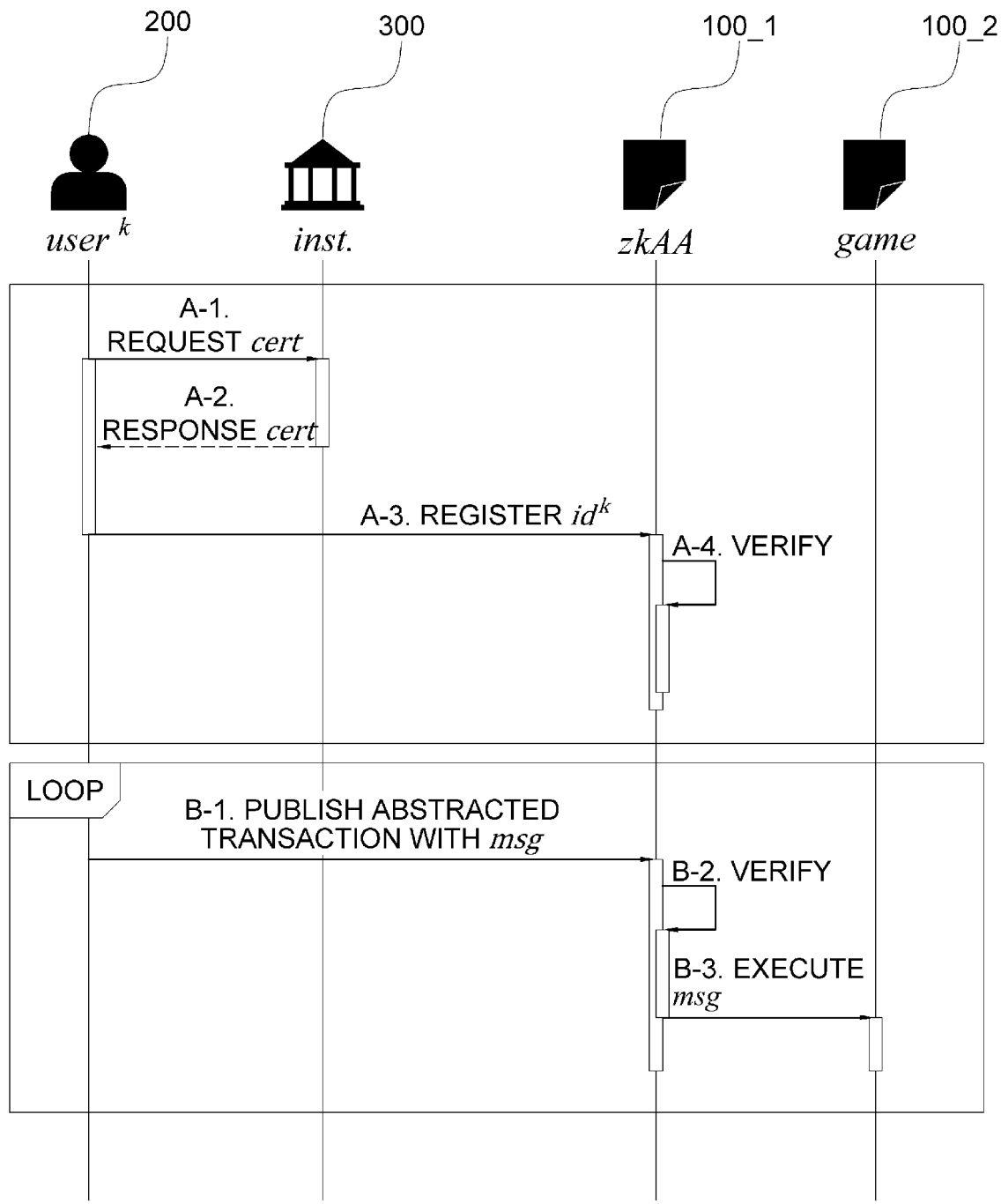
FIG. 3 is a drawing schematically illustrating a method of providing the user identity based on the zero-knowledge proof over the blockchain network by using the user certificate in accordance with one example embodiment of the present disclosure.

First, FIG. 3 is schematically illustrating a method of providing the blockchain services over the blockchain network in a scenario where the user identity itself is registered as the user blockchain identity in accordance with one example embodiment of the present disclosure.

By referring to the application example of FIG. 3, the user terminal 200 may engage in social login processes to gain access to and play games that are partially or fully facilitated by one or more smart contract. Herein, FIG. 3 is describing a case where the user certificate, i.e., the user's web2 identity, is hashed as H(cert) and then registered as the user blockchain identity. Also, FIG. 3 is denoting the address abstraction smart contract zkAA used for verifying the user identity as the blockchain node 100_1 on which the address abstraction smart contract is deployed, and the entity executing the smart contract for playing the games as another blockchain node 100_2.

By referring to FIG. 3, when the user terminal 200 navigates to a website of a game and clicks on a login button, the user terminal 200 may be redirected to a social login provider (e.g. Google or GitHub) for identity authentication at a step of A-1. Upon successful identity authentication, the user terminal 200 may acquire the user certificate containing information regarding the identity of the user and get redirected back to the game's website at a step of A-2. Then, the user terminal 200 may generate the user identity by computing the hash value of the user certificate and create the user identity proof to prove that the user certificate has been signed by the social login provider and that the user identity is identical to the hash value of the user certificate. Following, the user identity proof and the user identity generated may be published over the blockchain network 100 at a step of A-3. Accordingly, the address abstraction smart contract on the blockchain node 100_1 may verify the user identity proof, and if verified to be valid, may register the hash value of the user certificate as the user blockchain identity at a step of A-4. Herein, the unique user identity of the user terminal 200 is equivalent to the user blockchain identity. Through the process above, the user terminal 200 is now able to publish the abstracted transaction on the blockchain network 100.

Therefore, in response to the user terminal 200 publishing the abstracted transaction on the blockchain network 100 at a step of B-1, the abstracted transaction may be verified by the address abstraction smart contract on the blockchain node 100_1 at a step of B-2, and if the validity of the abstracted transaction is verified, the transaction message included in the abstracted transaction may be executed at a step of B-3.

The user identity that is based on the hash value of the user certificate can be applied to any decentralized applications (dApps) which are able to recognize hash-value-based identities instead of conventional address-based identities.

Figure 4:
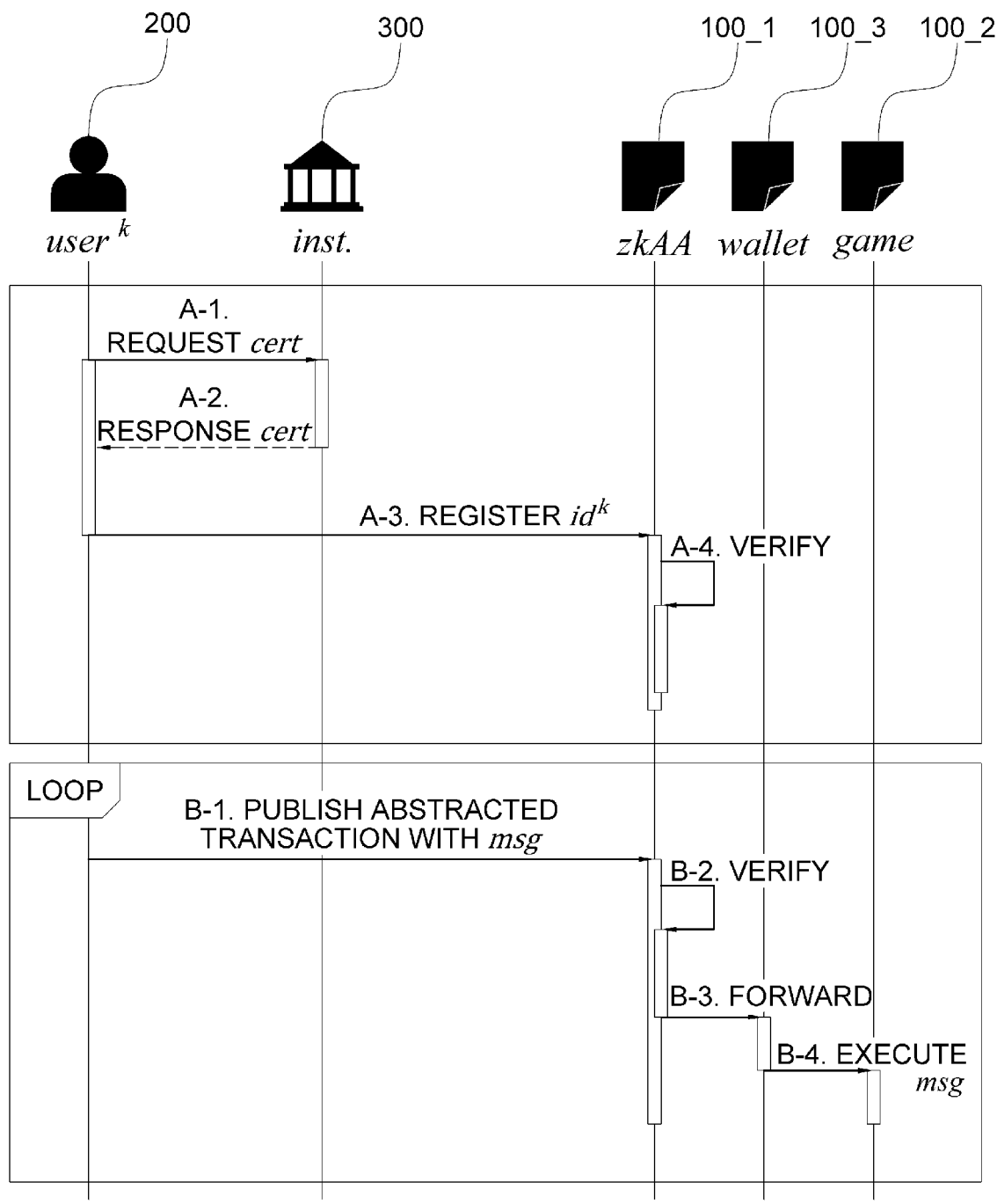
FIG. 4 is a drawing schematically illustrating another method of providing the user identity based on the zero-knowledge proof over the blockchain network by using the user certificate in accordance with one example embodiment of the present disclosure.

Next, FIG. 4 is schematically illustrating a method of providing the blockchain services over the blockchain network in a scenario where the user identity is matched with the wallet address of the smart contract wallet and the wallet address is registered as the user blockchain identity in accordance with one example embodiment of the present disclosure.

FIG. 4 is describing a method of performing zero-knowledge proof-based address abstraction by matching the user identity with the smart contract wallet on the blockchain network 100, and herein, the user blockchain identity $id_{chain}$, is the wallet address of the smart contract wallet or the contract account. Similar to FIG. 3, FIG. 4 is denoting the address abstraction smart contract zkAA used for verifying the user identity as the blockchain node 100_1 on which the address abstraction smart contract is deployed, and the entity executing the smart contract for playing the games as another blockchain node 100_2. In addition, FIG. 4 is depicting an additional blockchain node 100_3 at which the smart contract wallet managed by the user identity is located.

Steps involved in the process performed by the scenario in FIG. 4 are similar to those depicted in FIG. 3. In the scenario demonstrated in FIG. 4, however, upon validation of the user identity proof at a step of A-4, the address abstraction smart contract on the blockchain node 100_1 may determine a mapping relationship between the user identity and a newly minted smart contract wallet managed at the blockchain node 100_3. Accordingly, in carrying out requests made via the transaction message of the abstracted transaction, the smart contract wallet managed at the blockchain node 100_3 may directly interact with the smart contract on the blockchain node 100_2 for running the games at steps of B-3 and B-4.

In this case, the request made by the user terminal 200 may be forwarded as the transaction message to the smart contract wallet managed at the blockchain node 100_3 at a step of B-3, and then the smart contract wallet managed at the blockchain node 100_3 may call the target contract. The address abstraction method described as above can be applied to all dApps that utilize the conventional address-based identities, thereby enhancing cross-chain compatibilities.

Figure 5:
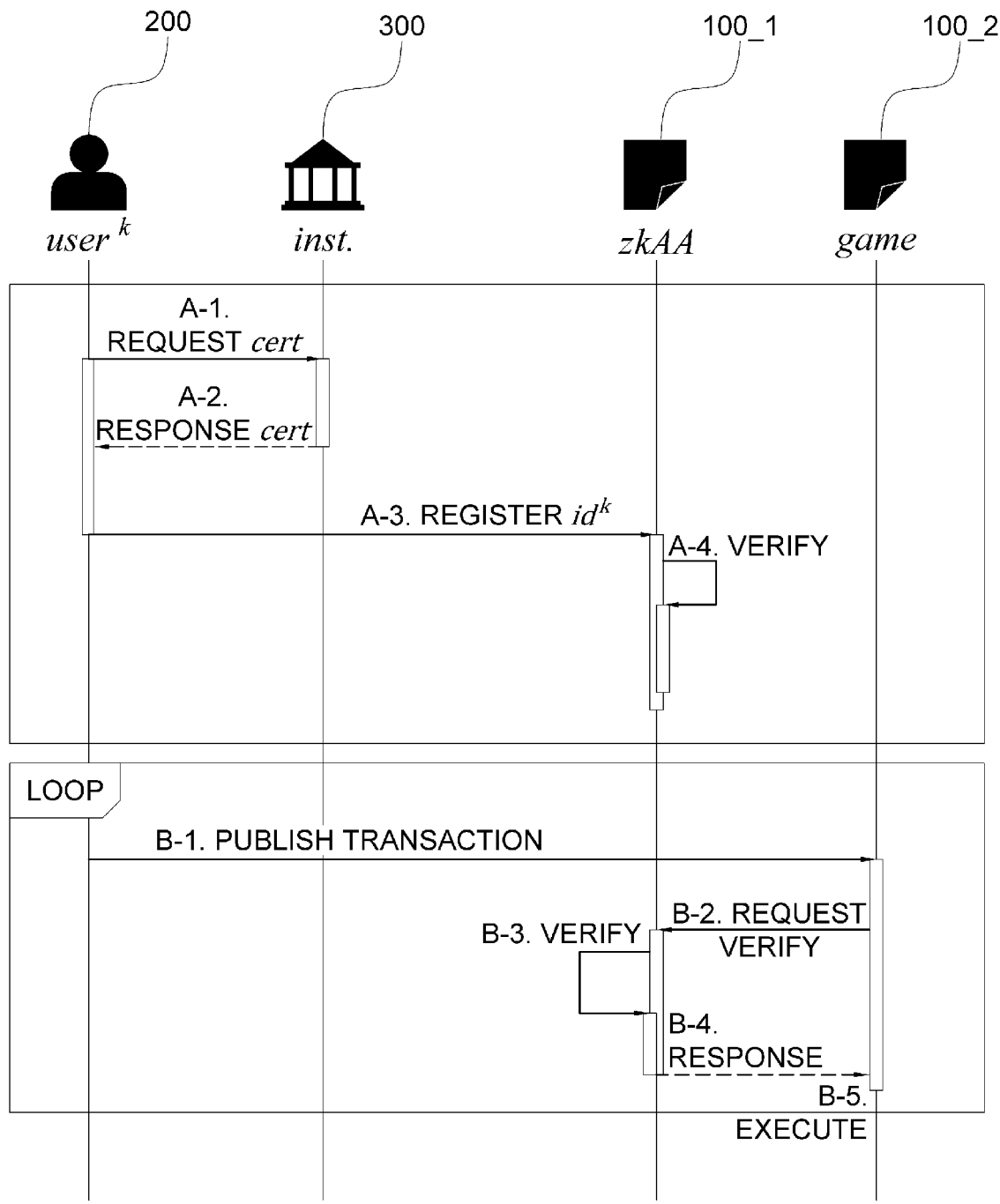
FIG. 5 is a drawing schematically illustrating still another method of providing the user identity based on the zero-knowledge proof over the blockchain network by using the user certificate in accordance with one example embodiment of the present disclosure.

Next, FIG. 5 is schematically illustrating a method of providing the blockchain services over the blockchain network in a scenario where the ownership of the user NFT is assigned to the Externally Owned Account (EOA) and the EOA is registered as the user blockchain identity in accordance with one example embodiment of the present disclosure. Herein, the user NFT is a digital asset that can represent ownership on the blockchain network.

In the scenario depicted by FIG. 5, at a step of A-4, i.e., the user identity registering step, the address abstraction smart contract on the blockchain node 100_1 may generate the user NFT that is associated with the user identity.

The most notable difference between the address abstraction method described in FIG. 5 and the address abstraction methods described in FIGS. 3 and 4 is that the user terminal 200 does not have to publish the abstracted transaction. Instead, the user terminal 200 may publish normal transactions as in typical blockchain systems. In the present disclosure, such a normal transaction is referred to as the executable transaction for convenience of explanation.

Then, the game's smart contract on the blockchain node 100_2 that has received the executable transaction may request the address abstraction smart contract on the blockchain node 100_1 to verify the ownership of the user NFT at a step of B-2, and upon successful verification of the ownership of the user NFT at steps of B-3 and B-4, the requests included in the transaction message may be executed in a conventional manner at a step of B-5. Herein, the user NFT acts as the user identity and enables interaction with the dAPPs. In this case, the user blockchain identity is the Externally Owned Account.

However, in this approach of performing the address abstraction, it is required for the address abstraction smart contract to verify the user identity through the ownership of the user NFT, resulting in increasing the complexity of dAPP development and execution. Also, this approach may not be compatible with pre-existing dApps that do not take into consideration of NFT ownership verification. In other words, using the user NFT as the user blockchain identity may reduce costs by adopting a conventional transaction registering method instead of using the abstracted transaction, but it also has shortcomings of being less compatible with the pre-existing dAPPs and being less secure as a result of omitting the process of transaction abstraction.

Figure 6:
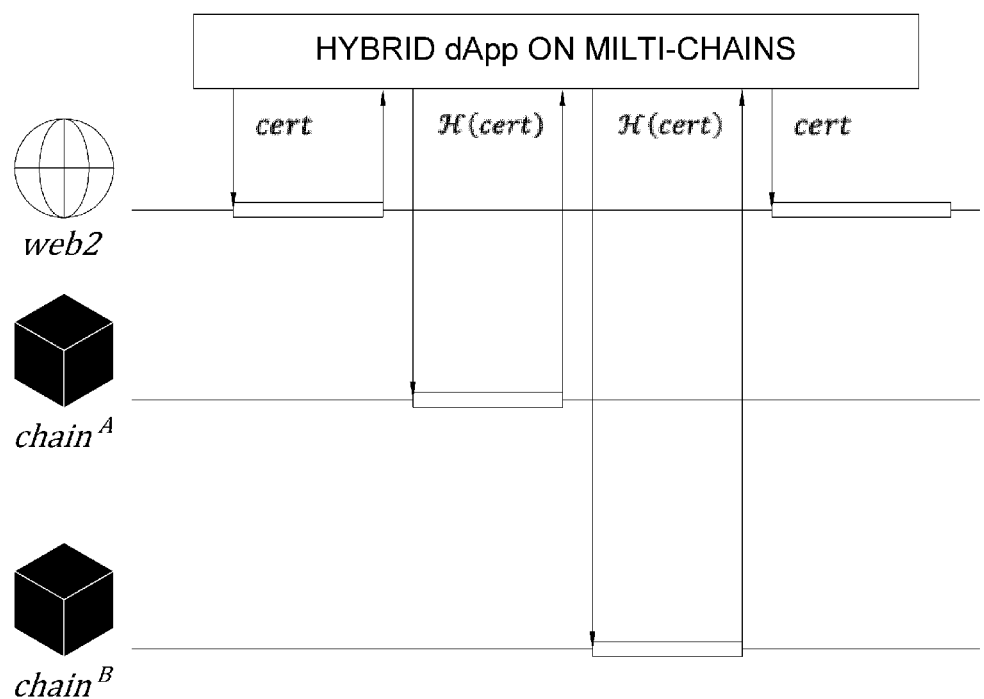
FIG. 6 is a drawing schematically illustrating a method of providing the user identity based on the zero-knowledge proof at hybrid decentralized application over the blockchain network by using the user certificate in accordance with one example embodiment of the present disclosure.

FIG. 6 is a drawing schematically illustrating a method of providing the user identity based on the zero-knowledge proof at hybrid decentralized applications over the blockchain network by using the user certificate in accordance with one example embodiment of the present disclosure.

The web2-web3 hybrid decentralized application, illustrated in FIG. 6, integrates conventional web-based systems with decentralized technologies such as blockchain, and is often used as a high-performance and a cost-effective application in areas such as gaming. This solution provides an enhanced user experience by integrating the ease of use of a fast-processing centralized system with a high level of security and decentralized characteristics of the blockchain systems.

However, one of the major obstacles faced during the development of hybrid decentralized applications is fragmentation of user management caused by separate user identity verification systems used for each of web2 and web3 applications. On the other hand, the address abstraction smart contract of the present disclosure may serve as a potential solution to the fragmentation of user management by enabling a uniform representation of the user identity across both the web2 and web3 applications.

In other words, by using the same user certificate to generate the user identity that can be used across various types of both the web2 and blockchain applications, the present disclosure is able to eliminate the complexity of managing multiple user identities across multiple identity verification systems for service providers. Thus, the present disclosure provides an alternative identity authentication solution useful for the hybrid application by generating the user identity that is compatible with both the web2 and web3 applications.

Next, FIG. 7 is a table schematically comparing a method of providing a user identity in a conventional blockchain system with the method of providing the user identity in accordance with one example embodiment of the present disclosure.

According to FIG. 7, the user identity used in the conventional blockchain system for identifying and managing digital assets in the process of performing transactions on the blockchain network is generated for each blockchain by an individual user and consists of a private key and a corresponding public key. Herein, the user may generate a signature value by signing the transaction message, etc. generated by the user with the private key that is not publicly disclosed. In turn, the entity who has generated the transaction may be proved by using the public key, publicly disclosed, on the signature value, and a pair of the private key and the public key generated for a specific blockchain cannot be used in other blockchains.

On the contrary, the user identity of the present disclosure, invented to solve the existing problems in mapping an external user certificate to a blockchain-specific user identity, is able to validate and use the user certificate, generated by a trusted web2 certification authority, in the blockchain system by performing zero-knowledge-proof-based verification. Accordingly, in the present disclosure, the user generates the user identity from the user certificate and proves the validity of the user identity through using zero-knowledge-based proofs, i.e., the user identity proof and the abstracted transaction proof, without disclosing the content of the user certificate. Herein, the user certificate generated by using the same user certificate can be used across different blockchain networks. Although the method of the present disclosure to service the user identity may incur additional costs in the processes of deploying the address abstraction smart contract and generating and validating the zero-knowledge-based proofs compared to the conventional methods, it exhibits high compatibility and security in that the method of the present disclosure enables the user to utilize the same user certificate to generate the user identity that can be used across various different blockchains by proving its validity with zero-knowledge-based proofs.

The present disclosure has an effect of eliminating a need for a private key storage and extending the use of the user identity to the multi-chain dApps or the web2-web3 hybrid dApps instead of limiting the use thereof to a specific blockchain application, by using the user certificate and its corresponding zero-knowledge proof without performing one-to-one mapping of external user identities outside the blockchain network to blockchain addresses.

The present disclosure has another effect of enabling the user blockchain identities used in one or more blockchain applications to be proven to belong to the same user by simply deploying a smart contract to existing blockchain systems or existing blockchain applications and using the smart contract to prove with the zero-knowledge proof that the user identity corresponding to the user blockchain identities corresponds to the user certificate, such that performing hardforks on the existing blockchain systems or the existing blockchain applications is not required.

The present disclosure has still another effect of enabling verification of the user identity without having to disclose personal information corresponding to the user identity, thereby securing the personal information against privacy leaks and enabling continued use of the user identity upon its creation.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a user identity based on zero-knowledge proof over a blockchain network by using a user certificate, comprising steps of:
   (a) in response to receiving from a user terminal a user identity generating request for generating a user identity to be used on a blockchain network, an address abstraction smart contract, operating at a virtual machine of the blockchain network, providing a user identity generating interface to the user terminal and thus instructing the user terminal (i) to generate the user identity corresponding to a user certificate issued from a certification authority and (ii) to generate a user identity proof by using user identity verifying parameters made public based on a zero-knowledge proof protocol, the user identity, the user certificate and a certification authority public key corresponding to the certification authority, wherein the user identity proof is used for proving that the user identity has been generated from the user certificate and that the user certificate has been issued by the certification authority; and
   (b) in response to receiving a user identity registering request, including the user identity verifying parameters, the user identity, the certification authority public key and the user identity proof, from the user terminal, the address abstraction smart contract (i) verifying the user identity proof by performing zero-knowledge-proof-based verification on the user identity verifying parameters, the user identity, the certification authority public key and the user identity proof and (ii) if the user identity proof is verified, registering the user identity as a valid identity of a user corresponding to the user terminal.

2. The method of claim 1, further comprising a step of: (c) in response to the user identity being registered as the valid identity of the user, the address abstraction smart contract performing at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user non-fungible token (NFT) by turning the user identity into a non-fungible token, (iii-2) assigning ownership of the user NFT to an Externally Owned Account, and (iii-3) registering the Externally Owned Account as the user blockchain identity.

3. The method of claim 1, wherein, at the step of (b), the address abstraction smart contract initializes a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity.

4. The method of claim 1, wherein the user identity verifying parameters are common reference strings generated at an address abstraction service provider by using relation values to be used for registering the user identity on a zero-knowledge proof basis, and wherein the address abstraction service provider that has deployed the address abstraction smart contract to the blockchain network stores the user identity verifying parameters on the blockchain network or on an external storage of the blockchain network such that the user identity verifying parameters are made retrievable by the address abstraction smart contract or the user identity generating interface.

5. The method of claim 1, wherein, at the step of (a), the user terminal acquires the user certificate from the certification authority outside the blockchain network, and obtains the certification authority public key (i) directly from the certification authority or (ii) from an external storage of the blockchain network or the blockchain network when the certification authority public key is registered on the blockchain network.

6. A method for providing a user identity based on zero-knowledge proof over a blockchain network by using a user certificate, comprising steps of:
   (a) in response to a user identity generated using a user certificate issued from a certification authority having been registered as a valid identity of a user and in response to receiving a transaction registering request from a user terminal, an address abstraction smart contract, operating at a virtual machine of a blockchain network, providing an abstracted transaction generating interface to the user terminal and thus instructing the user terminal (i) to generate the user identity corresponding to the user certificate and (ii) to generate an abstracted transaction proof by using abstracted transaction message verifying parameters made public based on a zero-knowledge proof protocol, the user identity, the user certificate, a transaction message hash value, corresponding to a hash value of a transaction message including information on a transaction intended to be performed by the user on the blockchain network, and a message sequence corresponding to the transaction message, and wherein the abstracted transaction proof is used for proving that the user who sent the transaction message is a true owner of the user identity and for proving validity of the transaction message and the message sequence; and
   (b) in response to receiving an abstracted transaction, including the abstracted transaction message verifying parameters, the user identity, the transaction message, the message sequence and the abstracted transaction proof, from the user terminal, the address abstraction smart contract (i) verifying the abstracted transaction proof by performing zero-knowledge-proof-based verification on the abstracted transaction message verifying parameters, the user identity, the transaction message hash value, corresponding to the hash value of the transaction message, the message sequence and the abstracted transaction proof, and (ii) if the abstracted transaction proof is verified, transferring the transaction message to the blockchain network so as to be executed and registering an execution result of the abstracted transaction as the transaction performed.

7. The method of claim 6, wherein, at the step of (a), in response to the user identity having been registered as the valid identity of the user, the address abstraction smart contract has further performed at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user non-fungible token (NFT) by turning the user identity into a non-fungible token, (iii-2) assigning ownership of the user NFT to an Externally Owned Account, and (iii-3) registering the Externally Owned Account as the user blockchain identity.

8. The method of claim 7, wherein, on condition that the address abstraction smart contract (i) has initialized a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity, and (ii) has registered the user identity itself or the wallet address matched with the user identity as the user blockchain identity by performing the first process or the second process, and
   in response to receiving the abstracted transaction from the user terminal, at the step of (b), the address abstraction smart contract (i) verifies whether the user blockchain identity corresponding to the user identity included in the abstracted transaction exists, (ii) when the user blockchain identity corresponding to the user identity is confirmed to exist, verifies whether a numerical value obtained by adding a value of 1 to a specific transaction sequence corresponding to the user identity corresponds to the message sequence included in the abstracted transaction, (iii) verifies the abstracted transaction proof by performing zero-knowledge-proof-based verification on the abstracted transaction message verifying parameters, the user identity, the transaction message hash value, corresponding to the hash value of the transaction message, the message sequence and the abstracted transaction proof, and (iv) when the abstracted transaction proof is verified, updates the specific transaction sequence to a numerical value corresponding to the message sequence, transfers the transaction message to the blockchain network so as to be executed and registers the execution result of the abstracted transaction as the transaction performed.

9. The method of claim 7, wherein, on condition that the address abstraction smart contract has registered the externally owned account corresponding to the user identity as the user blockchain identity by performing the third process, and
   in response to receiving the transaction registering request including the transaction message from the user terminal, at the step of (a), the address abstraction smart contract instructs the user terminal to generate the user identity corresponding to the user certificate,
   and in response to the user terminal transferring an executable transaction including the user identity and the transaction message to a specific blockchain node on which the executable transaction is to be executed and in response to the address abstraction smart contract receiving a verification request for the user identity from the specific blockchain node, at the step of (b), the address abstraction smart contract (i) verifies whether the user blockchain identity corresponding to the user identity included in the executable transaction exists and (ii) when the user blockchain identity corresponding to the user identity is confirmed to exist, transfers the transaction message to the blockchain network so as to be executed and registers an execution result of the executable transaction on the blockchain network.

10. The method of claim 6, wherein the abstracted transaction message verifying parameters are common reference strings generated at an address abstraction service provider by using relation values to be used for registering the abstracted transaction on a zero-knowledge proof basis, and wherein the address abstraction service provider that has deployed the address abstraction smart contract to the blockchain network stores the abstracted transaction message verifying parameters on the blockchain network or on an external storage of the blockchain network such that the abstracted transaction message verifying parameters are made retrievable by the address abstraction smart contract or the abstracted transaction generating interface.

11. The method of claim 6, wherein, at the step of (a), the transaction message includes information on function signatures corresponding to functions to be executed by the transaction, information on a target address on which the functions are to be executed, information on locations where data to be included as factors when calling the functions are located and information on cryptocurrency values required for execution of the functions.

12. A blockchain system for providing a user identity based on zero-knowledge proof over a blockchain network by using a user certificate, comprising:
at least one blockchain node including: at least one memory that stores instructions; and at least one processor configured to execute the instructions to perform: (I) in response to receiving from a user terminal a user identity generating request for generating a user identity to be used on a blockchain network, a process of providing a user identity generating interface to the user terminal and thus instructing the user terminal, via an address abstraction smart contract operating at a virtual machine of the blockchain network, (i) to generate the user identity corresponding to a user certificate issued from a certification authority and (ii) to generate a user identity proof by using user identity verifying parameters made public based on a zero-knowledge proof protocol, the user identity, the user certificate and a certification authority public key corresponding to the certification authority, wherein the user identity proof is used for proving that the user identity has been generated from the user certificate and that the user certificate has been issued by the certification authority; and (II) in response to receiving a user identity registering request, including the user identity verifying parameters, the user identity, the certification authority public key and the user identity proof, from the user terminal, a process of (i) verifying the user identity proof, via the address abstraction smart contract, by performing zero-knowledge-proof-based verification on the user identity verifying parameters, the user identity, the certification authority public key and the user identity proof and (ii) if the user identity proof is verified, registering the user identity as a valid identity of a user corresponding to the user terminal, via the address abstraction smart contract.

13. The blockchain system of claim 12, wherein the processor further performs a process of: (III) in response to the user identity being registered as the valid identity of the user, the processor, via the address abstraction smart contract, performing at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user non-fungible token (NFT) by turning the user identity into a non-fungible token, (iii-2) assigning ownership of the user NFT to an Externally Owned Account, and (iii-3) registering the Externally Owned Account as the user blockchain identity.

14. The blockchain system of claim 12, wherein, at the process of (II), the processor, via the address abstraction smart contract, initializes a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity.

15. The blockchain system of claim 12, wherein the user identity verifying parameters are common reference strings generated at an address abstraction service provider by using relation values to be used for registering the user identity on a zero-knowledge proof basis, and wherein the address abstraction service provider that has deployed the address abstraction smart contract to the blockchain network stores the user identity verifying parameters on the blockchain network or on an external storage of the blockchain network such that the user identity verifying parameters are made retrievable by the address abstraction smart contract or the user identity generating interface.

16. The blockchain system of claim 12, wherein, at the process of (I), the user terminal acquires the user certificate from the certification authority outside the blockchain network, and obtains the certification authority public key (i) directly from the certification authority or (ii) from an external storage of the blockchain network or the blockchain network when the certification authority public key is registered on the blockchain network.

17. A blockchain system for providing a user identity based on zero-knowledge proof over a blockchain network by using a user certificate, comprising:
at least one blockchain node including: at least one memory that stores instructions; and at least one processor configured to execute the instructions to perform: (I) in response to a user identity generated using a user certificate issued from a certification authority having been registered as a valid identity of a user and in response to receiving a transaction registering request from a user terminal, a process of providing an abstracted transaction generating interface to the user terminal and thus instructing the user terminal, via an address abstraction smart contract, operating at a virtual machine of a blockchain network, (i) to generate the user identity corresponding to the user certificate and (ii) to generate an abstracted transaction proof by using abstracted transaction message verifying parameters made public based on a zero-knowledge proof protocol, the user identity, the user certificate, a transaction message hash value, corresponding to a hash value of a transaction message including information on a transaction intended to be performed by the user on the blockchain network, and a message sequence corresponding to the transaction message, and wherein the abstracted transaction proof is used for proving that the user who sent the transaction message is a true owner of the user identity and for proving validity of the transaction message and the message sequence; and (II) in response to receiving an abstracted transaction, including the abstracted transaction message verifying parameters, the user identity, the transaction message, the message sequence and the abstracted transaction proof, from the user terminal, (i) verifying the abstracted transaction proof, via the address abstraction smart contract, by performing zero-knowledge-proofbased verification on the abstracted transaction message verifying parameters, the user identity, the transaction message hash value, corresponding to the hash value of the transaction message, the message sequence and the abstracted transaction proof, and (ii) if the abstracted transaction proof is verified, transferring the transaction message to the blockchain network so as to be executed and registering an execution result of the abstracted transaction as the transaction performed, via the address abstraction smart contract.

18. The blockchain system of claim 17, wherein, at the process of (I), in response to the user identity having been registered as the valid identity of the user, the processor has further performed, via the address abstraction smart contract, at least one of process among (i) a first process of registering the user identity itself as a user blockchain identity, (ii) a second process of (ii-1) generating a smart contract wallet managed by the user identity, (ii-2) matching the user identity with a wallet address of the smart contract wallet, and (ii-3) registering the wallet address as the user blockchain identity, and (iii) a third process of (iii-1) generating a user non-fungible token (NFT) by turning the user identity into a non-fungible token, (iii-2) assigning ownership of the user NFT to an Externally Owned Account, and (iii-3) registering the Externally Owned Account as the user blockchain identity.

19. The blockchain system of claim 18, wherein, on condition that the processor, via the address abstraction smart contract, (i) has initialized a transaction sequence of the user identity to 0, and wherein the transaction sequence generated by the address abstraction smart contract corresponds to a transaction accumulative counter, generated for each specific valid identity, to manage each specific transaction sequence performed by the each specific valid identity, and (ii) has registered the user identity itself or the wallet address matched with the user identity as the user blockchain identity by performing the first process or the second process, and in response to receiving the abstracted transaction from the user terminal, at the process of (II), the processor, via the address abstraction smart contract, (i) verifies whether the user blockchain identity corresponding to the user identity included in the abstracted transaction exists, (ii) when the user blockchain identity corresponding to the user identity is confirmed to exist, verifies whether a numerical value obtained by adding a value of 1 to a specific transaction sequence corresponding to the user identity corresponds to the message sequence included in the abstracted transaction, (iii) verifies the abstracted transaction proof by performing zero-knowledge-proof-based verification on the abstracted transaction message verifying parameters, the user identity, the transaction message hash value, corresponding to the hash value of the transaction message, the message sequence and the abstracted transaction proof, and (iv) when the abstracted transaction proof is verified, updates the specific transaction sequence to a numerical value corresponding to the message sequence, transfers the transaction message to the blockchain network so as to be executed and registers the execution result of the abstracted transaction as the transaction performed.

20. The blockchain system of claim 18, wherein, on condition that the processor, via the address abstraction smart contract, has registered the externally owned account corresponding to the user identity as the user blockchain identity by performing the third process, and in response to receiving the transaction registering request including the transaction message from the user terminal, at the process of (I), the processor, via the address abstraction smart contract, instructs the user terminal to generate the user identity corresponding to the user certificate, and in response to the user terminal transferring an executable transaction including the user identity and the transaction message to a specific blockchain node on which the executable transaction is to be executed and in response to the address abstraction smart contract receiving a verification request for the user identity from the specific blockchain node, at the process of (II), the processor, via the address abstraction smart contract, (i) verifies whether the user blockchain identity corresponding to the user identity included in the executable transaction exists and (ii) when the user blockchain identity corresponding to the user identity is confirmed to exist, transfers the transaction message to the blockchain network so as to be executed and registers an execution result of the executable transaction on the blockchain network.

21. The blockchain system of claim 17, wherein the abstracted transaction message verifying parameters are common reference strings generated at an address abstraction service provider by using relation values to be used for registering the abstracted transaction on a zero-knowledge proof basis, and wherein the address abstraction service provider that has deployed the address abstraction smart contract to the blockchain network stores the abstracted transaction message verifying parameters on the blockchain network or on an external storage of the blockchain network such that the abstracted transaction message verifying parameters are made retrievable by the address abstraction smart contract or the abstracted transaction generating interface.

22. The blockchain system of claim 17, wherein, at the process of (I), the transaction message includes information on function signatures corresponding to functions to be executed by the transaction, information on a target address on which the functions are to be executed, information on locations where data to be included as factors when calling the functions are located and information on cryptocurrency values required for execution of the functions.

* * * * *